(12) United States Patent
Eckleder (10) Patent No.: US 7,676,678 B2
(45) Date of Patent: Mar. 9, 2010

(54) METHOD FOR SIGNING A DATA PACKAGE AND SIGNING APPARATUS

(75) Inventor: Andreas Eckleder, Karlsbad (DE)

(73) Assignee: Nero AG, Karlsbad (DE)

(*) Notice: Subject to any disclaimer, the term of this patent is extended or adjusted under 35 U.S.C. 154(b) by 1115 days.

(21) Appl. No.: 11/304,873

(22) Filed: Dec. 14, 2005

(65) Prior Publication Data
US 2007/0074037 A1    Mar. 29, 2007

Related U.S. Application Data

(63) Continuation of application No. PCT/EP2005/009562, filed on Sep. 6, 2005.

(51) Int. Cl.
*H04L 9/00* (2006.01)
(52) U.S. Cl. .................. 713/176; 713/181; 380/277
(58) Field of Classification Search .......... 370/277, 370/28–29, 37, 44; 713/168, 173, 176–177, 713/180–181
See application file for complete search history.

(56) References Cited

U.S. PATENT DOCUMENTS 4,881,264 A * 11/1989 Merkle ............... 713/177
5,005,200 A    4/1991 Fischer et al.
5,606,617 A * 2/1997 Brands ............... 380/30
6,292,569 B1   9/2001 Shear et al.

FOREIGN PATENT DOCUMENTS

WO    WO 98/57436    12/1998

OTHER PUBLICATIONS

ETSI Standards. European Telecommunications Standards Institute. Sophia-Antipo, FR. May 2000.

* cited by examiner

*Primary Examiner*—Hosuk Song
(74) *Attorney, Agent, or Firm*—Michael A. Glenn; Glenn Patent Group (57) ABSTRACT

A method for signing a data package uses a signing apparatus, the signing apparatus having a binary identification code comprises the step of providing a set of node keys and a check value for the data package and the step of determining a signature block having a plurality of signature fields. In addition, the method comprises the step of providing the binary identification code of the signing apparatus and the signature block in order to sign the data package.

20 Claims, 4 Drawing Sheets

METHOD FOR SIGNING A DATA PACKAGE AND SIGNING APPARATUS

CROSS-REFERENCE TO RELATED APPLICATION

This application is a continuation of copending International Application No. PCT/EP2005/009562, filed Sep. 6, 2005.

BACKGROUND OF THE INVENTION

1. Field of the Invention

The present invention relates to the field of digital rights management and especially to the sub-field of signing a data package 2. Description of the Related Art Digital signatures are an important means for providing the authenticity of data and its origin. It is known in the art that pairs of public and private keys can be used to prove the identity of a sender of digital content by building a hash value over the digital content and digitally signing it using a private key. The receiver will then apply a corresponding public key to verify that the information has been signed by a specific identity.

Such digital signature systems are generally implemented using a symmetric encryption by means of complicated mathematical methods, as, for example, the RSA method (RSA=Rivest-Shamir-Adleman).

However, these requirements of RSA and other asymmetric encryption methods in terms of computation power are considerable, which makes difficult to deploy digital signature creation and verification in consumer electronic devices where computation power is very limited.

SUMMARY OF THE INVENTION

It is an object of the present invention to provide a concept for improving a scheme for signing and verifying a signature including the possibility to invalidate signing secrets held by signers that are known to be illegitimate. Furthermore, it is the object to provide a concept which requires less computational intensive encryption algorithm.

In accordance with a first aspect, the present invention provides a method for signing a data package using a signing apparatus, the signing apparatus being assigned a binary identification code, the method for signing having the steps of: providing a set of node keys and a check value for the data package, the node keys being different from each other and each node key of the set of node keys being identifiable by a node key number and wherein the check value for the data package being derived from the data package or an carrier identification code of an information carrier the data package is stored on; determining a signature block having a plurality of signature fields, wherein each of the signature fields is identifiable by a signature field number, wherein the signature field having a first signature field number has a first encrypted version of the check value, the first encrypted version of the check value being determined using the node key having a first node key number as encryption key and wherein the signature field having a second signature field number has a second encrypted version of the check value, the second encrypted version of the check value being calculated using the node key having a second node key number as encryption key, wherein the first signature field number corresponds to the first node key number and the second signature field number corresponds to the second node field number; and providing the binary identification code of the signing apparatus and the signature block in order to sign the data package.

In accordance with a second aspect, the present invention provides a signing apparatus for signing a data package, the signing apparatus being assigned a binary identification code, the signing apparatus having: a provider being configured for providing a set of node keys and a check value for the data package, the node keys being different from each other and each node key of the set of node keys being identifiable by a node key number and wherein the check value for the data package being derived from the data package or an carrier identification code of an information carrier the data package is stored on; a determiner being configured for determining a signature block having a plurality of signature fields, wherein each of the signature fields is identifiable by a signature field number, wherein the signature field having a first signature field number has a first encrypted version of the check value, the first encrypted version of the check value being determined using the node key having a first node key number as encryption key and wherein the signature field having a second signature field number has a second encrypted version of the check value, the second encrypted version of the check value being calculated using the node key having a second node key number as encryption key, wherein the first signature field number corresponds to the first node key number and the second signature field number corresponds to the second node field number; and a provider being configured for providing the binary identification code of the signing apparatus and the signature block in order to sign the data package.

In accordance with a third aspect, the present invention provides a method for validating a signature of an data package using a validation apparatus, wherein the data package, a signature block and a binary identification code of a signing apparatus is stored on an information carrier, the signature block having a plurality of signature fields, wherein each of the signature fields is identifiable by a signature field number and wherein each of the signature fields having stored therein a signature code and wherein a root key and a binary tree is stored on a memory in the validation apparatus, the method having the following steps: reading the data package, the signature block (Signature) and the binary identification code from the information carrier; providing a check value for the data package wherein the check value for the data package being derived from the data package or an carrier identification code of an information carrier the data package is stored on; calculating a node key and a position number on the basis of the root key, the binary tree and the binary identification code using the binary identification code as a scheme for passing through the binary tree; decrypting the signature code being stored in the signature field having a signature field number corresponding to the position number, wherein the node key being used as decryption key in order to obtain a reference value, or, encrypting the check value using the node key as an encryption key in order to obtain a further reference value; and accepting the signature as valid, if the reference value is in a predefined relation with the check value or if the further reference value is in a predefined relation to the signature code being stored in the signature field having a signature field number corresponding to the position number.

In accordance with a fourth aspect, the present invention provides a validation apparatus for validating a signature of an data package, wherein the data package, a signature block and a binary identification code of a signing apparatus is stored on an information carrier, the signature block having a plurality of signature fields, wherein each of the signature fields is identifiable by a signature field number and wherein each of the signature fields having stored therein a signature code and wherein a root key and a binary tree is stored on a memory in the validation apparatus, the validation apparatus having: a reader being configured for reading the data package, the signature block and the binary identification code from the information carrier; a provider being configured for providing a check value for the data package wherein the check value for the data package being derived from the data package or an carrier identification code of an information carrier the data package is stored on; a calculator being configured for calculating a node key and a position number on the basis of the root key, the binary tree and the binary identification code using the binary identification code as a scheme for passing through the binary tree; a decrypter being configured for decrypting the signature code being stored in the signature field having a signature field number corresponding to the position number, wherein the node key being used as decryption key in order to obtain a reference value, or, encrypting the check value using the node key as an encryption key in order to obtain a further reference value; and an acceptor being configured for accepting the signature as valid, if the reference value is in a predefined relation with the check value or if the further reference value is in a predefined relation to the signature code being stored in the signature field having a signature field number corresponding to the position number.

In accordance with a fifth aspect, the present invention provides computer programs having a program code for performing the above-mentioned methods, if the computer program runs on a computer.

The present invention is based on the finding that each signer is assigned a unique value encoded in an arbitrarily chosen number of bits. Each bit of the unique value can be assigned a unique key value further on referred to as node key such that, for example, the node key assigned to the most significant bit is unique to the device. The node key assigned for example to the second-most significant bit is for example shared by two devices. In this example, in general, the node key number n is shared by $2^{k-1-n}$ devices where k is a number of bits used to encode the unique value assigned to the signer. Each participating component or instant or entity that will receive signed data is then for example given a set of secret data that can be used to prove the authenticity of the digital signature. This set comprises for example a root key and a binary tree, wherein for example each leaf node of the binary tree holds exactly one key (denoted as the authorization key) that can be used to encrypt the root key to obtain a key that is used by at least one assigner to sign the content.

Each node of the binary tree can be uniquely identified by a value consisting of as many bits as it has ancestors: Be n the number of ancestors, this value matches the n most significant bits of one or more unique values of one or more signers. Each individual bit determines where to branch the binary tree, starting from the root node (having the root key).

Therefore, in a signer, the inventive concept for example comprises the steps of creating a digital signature by creating a content hash over the content that is to be signed; encrypting the hash consecutively with all node keys and adding the unique value identifying the signer.

Preferably, a signature verification is done by descending into the binary tree, consecutively processing the bit values of the signer's unique value, starting with the root node, stopping at the first leaf node that is found and using its key to encrypt the root key to obtain a key that can be used to decrypt the encrypted hash n, where n is the number of ancestors of the leave node; creating a content hash over the signed content; comparing the hash and comparing it to the decrypted value of hash n.

Thus, the present invention provides the advantage that if a signer turns out to be not reliable, the secret used by this signer, that is the node keys used by this signer can be declared invalid. This invalidity of special node keys can then be, for example, transmitted to validation units, for example in DVD-players, by a firmware update of a memory in these players in which new node keys and a new binary tree are saved replacing the binary tree and the node keys declared invalid. Thus, it is possible to revoke signatures issued by unreliable signers without replacing the complete player unit, for example the DVD-player in entire, wherein still the low computational power is used for encrypting the content or the hash value in order to use the content, for example to play the DVD-movie stored on a medium like a DVD-disc.

According to a first embodiment of the present invention, the binary identification code has a predefined number of bits, wherein the set of node keys has a predefined number of node keys and wherein the step of determining comprises determining a signature block having a predefined number of signature fields wherein the predefined number of bits corresponds to the predefined number of node keys and to the predefined number of signature fields. This provides the advantage that by a special amount of bits in the binary identification code, the set of node keys and the signature fields, it is now possible to encode the content in a way such that each bit of the binary identification code has assigned a signature field, thus improving the possibility of revoking signatures issued by distinct signers.

Furthermore, according to a further embodiment of the present invention, the first node key is uniquely assigned to the signing apparatus and the second node key is assigned to the signing apparatus and a further signing apparatus, wherein the binary identification code has a most significant bit and a second-most significant bit, wherein the step of determining comprises arranging the first encrypted version in a signature field having a position in the signature block corresponding to a position of the most significant bit in the binary identification code and wherein the step of determining comprises arranging the second encrypted version in a signature field having a position in the signature block corresponding to a position of the second-most significant bit in the binary identification code. Thus, it is possible to identify each signer by one node key he uses but also to identify groups of signers, for example, recorders of a special type or sold by a whole company. Thus, it is possible to revoke signatures issued by one single signer or a group of signers, if they turn out to be unreliable, for example.

According to a further embodiment, the step of determining comprises performing a symmetric encryption operation in order to obtain the first and second encrypted version of the check value. This provides the advantage that an algorithm can be applied which is computational less challenging.

In addition, according to a further embodiment, the step of performing the symmetric encryption operation comprises performing an encryption operation according to the advanced encryption standard. This provides the advantage that a well known method can be used.

Furthermore, in accordance with a further embodiment of the present invention, the step of providing the set of node keys and a check value comprises calculating a Hash function on the data package in order to obtain a Hash value and wherein the step of providing the set of node keys and a check value furthermore comprises performing a logical EXCLUSIVE-OR-combination of the Hash value and the carrier identification code, wherein the carrier identification code is uniquely assigned to the information carrier. This provides the advantage that the content and/or an identification specifying the information carrier, the data package is stored on, can uniquely be included in the check value such that a transfer of the information of the data package from one to another data information carrier is not possible. In order to realize this, an information carrier should have a carrier identification code, which is uniquely assigned to the information carrier in a production process of the information carrier, for example.

According to a further embodiment of the present invention, the step of calculating the Hash function comprises recursively encrypting a segment of the data package using the Hash value of a preceding iteration step of the recursion as an encryption key. This provides the advantage that the complete content is considered when calculating the check value and not only a segment. However, the check value can still be held small.

In another embodiment of the present invention, the method comprises the step of storing the binary identification code of the signing apparatus and the signature block on the information carrier the data package is stored on. This provides the advantage that the signature is then directly coupled to the information carrier the data package is stored on. In such an instance, it is an advantage that the carrier identification code can also be included in the signature and therefore an illegal transfer of a copy from one information carrier to another can be identified and revoked.

In a further embodiment of the present invention, the binary tree comprises leaf nodes having assigned an authorization key, and wherein the step of calculating comprises the step of encrypting the root key using the authorization key as an encryption key. This encryption provides the advantage that the encryption of the known authorization key in order to obtain the node key—(which is not prior known to the validation apparatus) enlarges the security that the content is recorded by a legal recording (or signing) apparatus. Thus the authenticity of the signature is encrypted in the binary tree, having leaf nodes with authorization keys and wherein this tree can be replaced in the validation apparatus, if one of the signers shall be considered as not reliable.

In a further embodiment of the present invention the step of encrypting comprises performing a symmetric encryption algorithm for encrypting the root key. This provides the advantage that a low-complexity encryption algorithm can be used.

In accordance of a further embodiment a node of the binary tree has a first edge leading to a first child of the node and wherein the node has a second edge leading to a second child of the node, the first edge being a portion of a first path through the binary tree and the second edge being a portion of a second path through the binary tree, wherein the step of calculating comprises the step of determining the first or second path on the basis of a value of a bit in the binary identification code. This provides the advantage that the binary identification code can be used to identify the recording device such that special recording devices can be identified by their binary identification code. This binary identification code can then be used in order to pass through the binary tree which is saved in the validation apparatus. This enables, in combination with an update of the binary tree in the validation apparatus that special signatures can be revoked if the respective signers were identified to be unreliable.

Furthermore, in an optional embodiment, the binary tree comprises a plurality of levels of nodes, each node of a level of nodes being separated from the root node of the binary tree by an equal number of edges, wherein the binary identification code has a number of positions, each position corresponding to a level of nodes in the binary tree, and wherein the step of determining the first or second path is further based on considering a value of the bit in a position of the binary identification code corresponding to a first level of nodes and on considering a value of a bit in a position of the binary identification code corresponding to a second level of nodes in the binary tree. This provides the advantage that the branching of the tree can give a hint on the size of the group of recording devices from which the signature originates. Thus, it is possible that to differentiate between one single device or a group of users as for example a complete model of a recording device or all recording devices of a company.

In a further embodiment the step of calculating comprises recursively using the bits of the binary identification code starting with least significant bit of the binary identification code. This provides the advantage that the validation of the signature is performed in a direction from the root node (which corresponds to the least significant bit in the binary identification code) to a leaf node. This allows to revoke a whole branch of the binary tree from the origin, if, for example, a whole device type model or a complete company is considered to be unreliable and signatures of these device types or devices from this company are recognized.

In a further embodiment a node of the binary tree is a leaf node, wherein the step of calculating further comprises the step of evaluating the signature as invalid, if using the binary identification code as a scheme for passing through the binary tree leads to a leaf node and a number of bits of the binary identification code is larger than a number of edges from the leaf node to the root node in the binary tree. This provides the advantage that a binary identification code can be identified if it exceeds a leaf node in the binary tree. Then, consequently, the binary identification code must originate from a signer which is considered to be not reliable or illegal such that the signature of such a signer has to be revoked.

A further embodiment of the present invention comprises the step of updating the binary tree in the memory of the validation apparatus. This provides the advantage that the binary tree can be updated in the validation apparatus in the case, one or several signers are identified to be unreliable or illegal. Therefore, it is possible in the present invention to revoke recordings (data packages) of specified recorders (signers) without the need collect all players which are already distributed. It is just helpful just to provide an update to the firmware of the players having said validation apparatus as to provide information to the players which recordings shall be revoked and therefore shall not be played.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
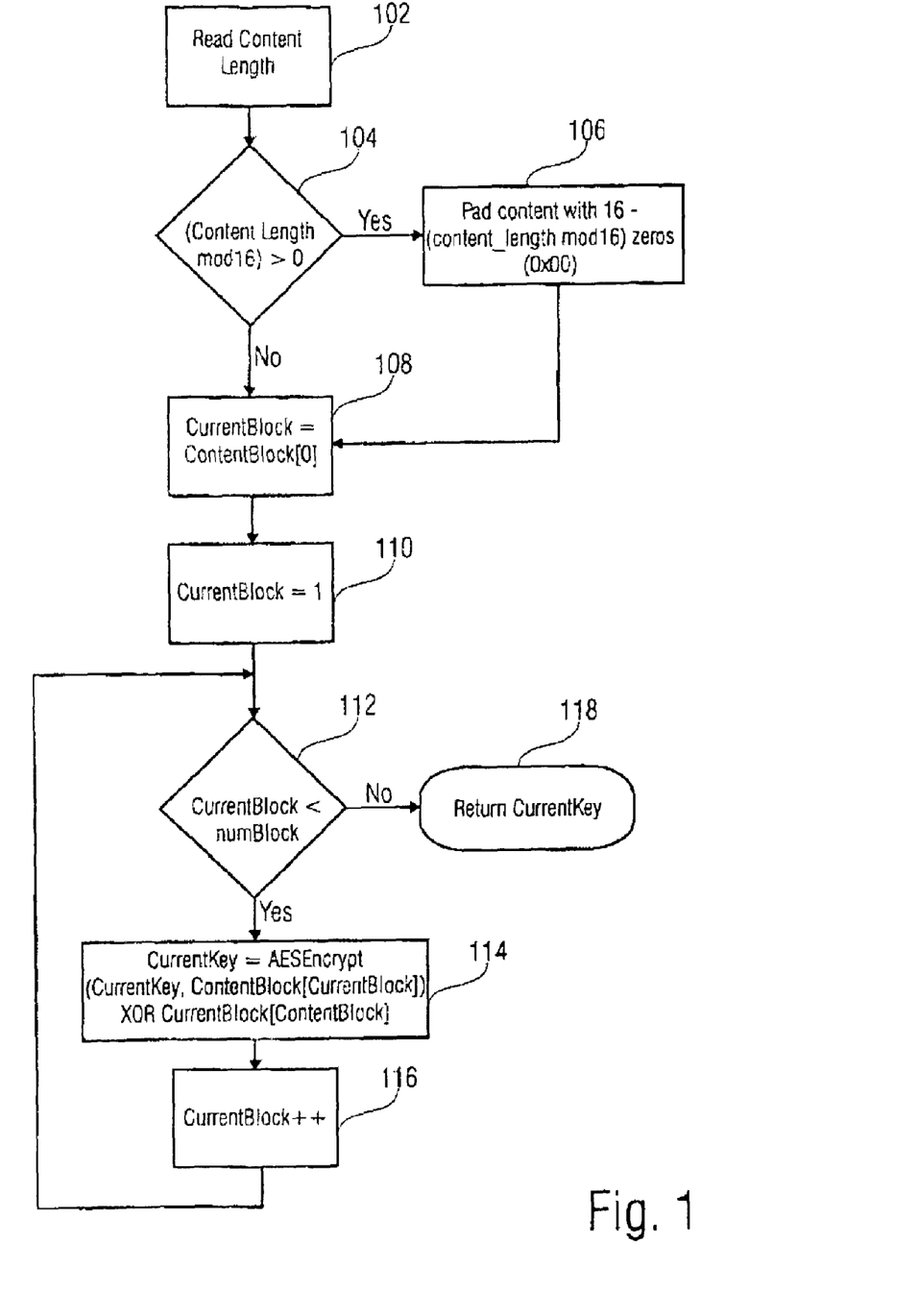
FIG. 1 is a flow diagram of the inventive method according to a first embodiment in which a hash value is built, uniquely identifying the content that is to be signed.

In FIG. 1 the first embodiment of the inventive method is disclosed in a flow diagram. In this embodiment, in a first step 102 the content length is read. Following, if the content length is not an integer multiple of 16 (step 104) a zero-padding is accomplished in step 106. If the content length is an integer multiple of 16, (which is also true after the accomplishment of step 106), a variable CurrentKey is loaded with a segment of the data to be encrypted in step 108. Expressed in other words, the variable ContentKey is loaded with the first content block having an ordering index with value 0. As content the payload data, for example the digital data of a movie stored on a DVD-disc, can be used. Following, in step 110, a variable CurrentBlock is loaded with a value of 1. If the variable CurrentBlock is smaller than a code number of blocks, the payload data is divided into (step 112), the variable CurrentKey is a signed value which is a logical EXCLUSIVE-OR-combination of the content block having an ordering index being equal to the variable CurrentBlock and a result of an AES-encryption operation using as input the variable CurrentKey and the content block having the ordering index of the variable CurrentBlock (step 114). After performing step 114, the variable CurrentBlock is incremented by 1 and step 112 is again performed. In the case that in step 112 it is identified that variable CurrentBlock is equal or larger than the total number of blocks the payload data is divided into, the variable CurrentKey is output in step 118. The increment of the variable CurrentBlock is disclosed in FIG. 1 in step 116. Therefore, it can be seen from FIG. 1 that a recursive AES-encryption is carried out due to the loop defined by steps 112, 114 and 116 wherein in step 114 the data of the variable CurrentKey is used as an input for the AES-encryption operation (AES=Advanced Encryption Standard).

In a preferred embodiment, AES-128, a symmetric encryption algorithm as known in the art is used for encryption/decryption and the size of the ID assigned to each signer is for example 40 bits.

In a preferred embodiment, the hash value is created by a hash function implemented using the AES-128 algorithm. The creation of hash values is done by a function defined as follows:

HashValue=AESHash(content, content_length),

The variable content denotes the data representing the DVD-movie for example and the variable content_length denotes the length of the DVD-movie, for example.

The argument of the AESHash-operation refers to a sequence of content_length bytes of input data. The content length should be at least 17 bytes and will be padded with zeros (0x00) to the next multiple of 16 as shown in FIG. 1 in step 106. Furthermore, the flow chart of FIG. 1 illustrates how to build the AESHash-value is done, making use of a function encrypted block=AESEncrypt(key, unencrypted block)

creating an encrypted block form an unencrypted block of data using the key as encryption key. This process is illustrated in more detail in FIG. 1.

In a further preferred embodiment, the Hash value is used to uniquely identify content and its physical storage media by combining a hash with a value unique to the physical storage media. Such a unique value can be the disc key of the CSS (CSS=Content Scrambling System).

Figure 2:
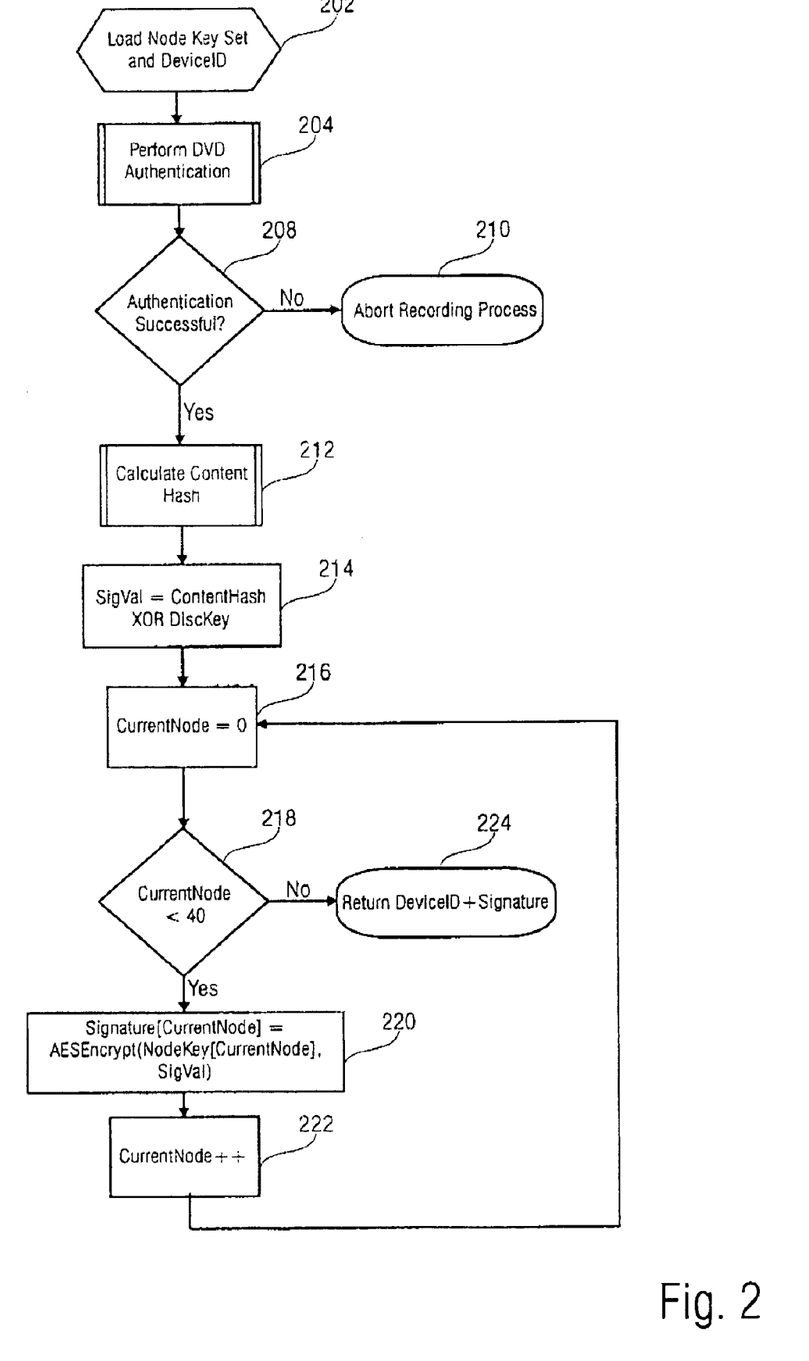
FIG. 2 is a flow diagram according to the inventive method in accordance with a second embodiment, wherein a signature block is created providing the authenticity of a DVD-video disc through its content and cryptographic disc key.

FIG. 2 discloses a flow chart of a method in accordance with a second embodiment. Herein, a signature block is created providing the authenticity of a DVD-video disc through its content and cryptographic disc key. In a first step 202 a node key and a device ID (signers identification code) are loaded. Following to step 202, a DVD authentication is performed in step 204. In a further step 208 it is determined whether the authentication was successful or not. In the case the authentication is not successful, the recording process is aborted (step 210). If the authentication is successful in step 208, a content hash value is calculated in step 212 which is performed according to the method as disclosed in FIG. 1 wherein the content hash is equal to the variable CurrentKey as returned in step 118 in FIG. 1. In a further step 214, a value for a variable SigVal is calculated by EXCLUSIVE-OR-combining the values of the content hash with the value of the variable (disc key). In a further step 216, a variable CurrentNode is set to 0. In a following step 218, it is determined whether the variable CurrentNode is smaller than 40. If this condition is true as determined in step 218, in a further step 220 a value Signature (signature field) with an ordering index having the value of the variable CurrentNode is assigned an encrypted value. This encrypted value is generated by an AES-encryption operation using as inputs the value of the variable SigVal and the value of the variable Nodekey having the ordering index of the value of the variable CurrentNode. Thus, it is clear that the variable Signature is actually a field or array of variables, wherein one single variable of this array of variable is assigned a value in step 220. In a following step 222 the variable CurrentNode is incremented by 1 and the algorithm shown in FIG. 2 is further processed with step 216 respectively 218, thus checking whether the value of the variable CurrentNode is smaller than 40. In the case the value of the variable CurrentNode is not smaller than 40, the values of the field variable "Signature" is a value for the variable DeviceID is returned in step 224. Therefore, it becomes clearly obvious from FIG. 2 that the output of the method disclosed in FIG. 2 is a field of values under the variable name Signature and the value for the variable DeviceID. Thus, it becomes furthermore obvious from FIG. 2 that this value in the array Signature are AES-encrypted versions of the variables Nodekey and SigVal wherein the variable NodeKey is also an array having an ordering index being dependent on the variable CurrentNode.

Thus, FIG. 2 illustrates the process of signing a hash value and combining it with a disc key. Each authorized recording device is for example assigned a unique 40 bit number. Each bit of this number is assigned a 128 bit node key. The node key assigned to the most significant bit is unique to that device. The node key assigned for example to the second-most significant bit (bit number 38) is shared by two devices. In general, node key $K_n$ is shared by $2^{(39-n)}$ device(s). Thus, an authorized recording contains the content hash (especially in the fields of the array Signature), combined with the disc key, 40 times, each time encrypted using a different key from the set of 40 128-bit node keys and the 40 bit unique number associated with the recording device.

Figure 3:
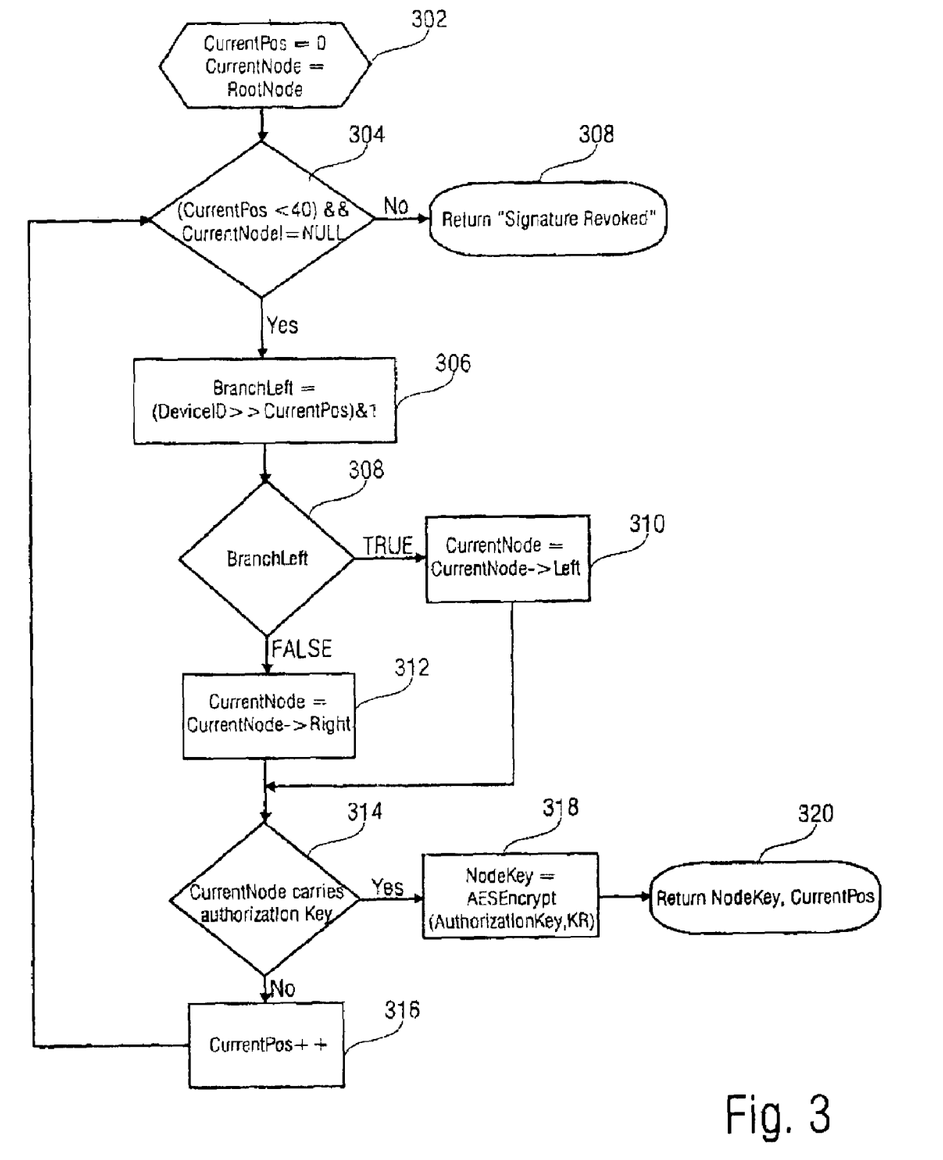
FIG. 3 is a flow diagram of the inventive method in accordance with a third embodiment, in which the process of recovering the node key from a root key and the binary tree is illustrated.

FIG. 3 illustrates a step of the present invention in a flow diagram according to a third embodiment. Herein, the process or method of recovering the node key from a root key in the binary tree is illustrated. In a first step 302 a variable CurrentPos is assigned a value of 0 and the variable CurrentNode is assigned the value RootNode. Then, in a second step 304 it is determined whether the variable CurrentPos has the value being smaller than 40 and the value of the variable CurrentNode is not NULL. If this condition is true, in a following step 306 a variable BranchLeft is assigned a value which is determined by a right-shift of the value of the variable DeviceID by a number of bits according to the value of the variable CurrentPos being logically AND-combined with 1. If the condition checked in step 304 is not true, a signal is returned in step 308 indicating that the signature is revoked. Following the operation in step 306, it is determined whether the variable BranchLeft has the Boolean value TRUE or FALSE (step 308). If the value of the variable is TRUE, the variable CurrentNode is chosen such that in the binary tree the left child node is assigned to the variable CurrentNode (step 310). In the case, the value of the Boolean variable BranchLeft is FALSE, in step 312, the variable CurrentNode is assigned a the right child of the node under search such that the path in the right direction is chosen in the binary tree. Following the operations in steps 310 and 312, it is checked in step 314 whether the node in the binary tree indicated by the value of the variable CurrentNode carries an authorization key. If this is not true, in a further step 316 the value of the variable CurrentPos is incremented by 1 and the method in FIG. 3 is further processed with step 314 such that an iteration loop is closed (step 316). In the case, the node in the binary tree indicated by the value of the variable CurrentNode carries an authorization key, a node key is determined in step 318 by performing an AES-encryption operation using the authorization key and the root key KR as input for the encryption operation. As a result of this encryption operation, a node key and the value of the variable CurrentPos is output in step 320.

Thus, FIG. 3 illustrates the process of recovering the node key from a root key and a binary tree. A player device starts, for example, with the least significant bit of the unique number and its associated node key. Taking the bits of the unique numbers as input, the player descends into a binary tree stored within the player itself, until it hits a leaf node or a node that does not carry a child according to the next bit value within the unique number. In the later case, the recording device is considered unauthorized. Each leaf node carries an authorization key. Each player also carries a root key KR which is used to reconstruct the node key associated with the current bit position from the authorization key. This node key can then be used to decrypt the hash value stored on the media. If it matches the expected value, the signature is considered valid.

Figure 4:
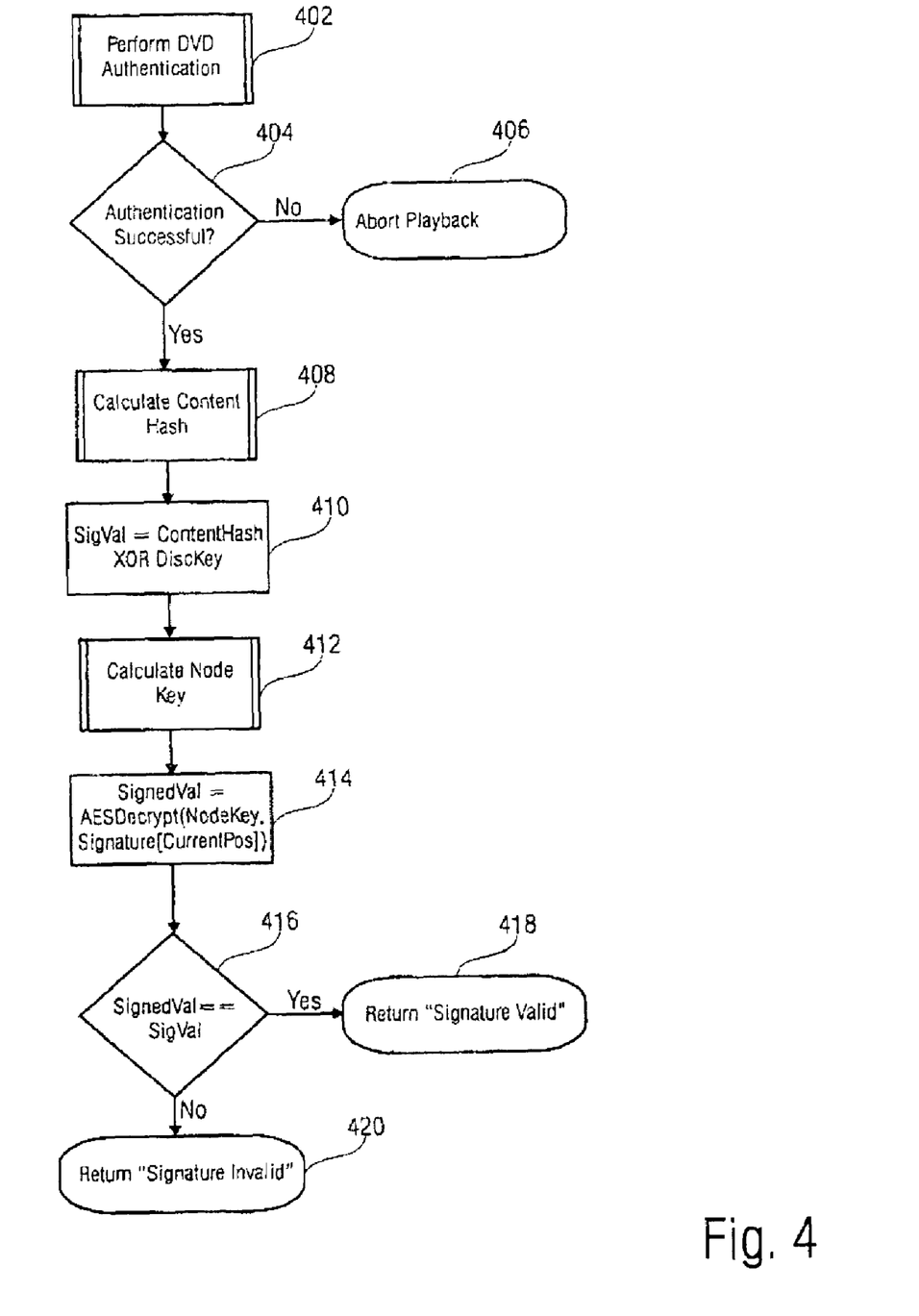
FIG. 4 is a flow diagram of an inventive method in accordance with a fourth embodiment, in which the authenticity of the signed DVD-video disc is verified.

FIG. 4 illustrates the present invention according to a fourth embodiment. To be more specific, FIG. 4 discloses a method for verifying the authenticity of the signed DVD-video disc. In a first step 402 a DVD-authentication is performed. Then, in a further step 404 it is determined whether the authentication was successful or not. If the authentication was not successful, the playback of the data on the DVD is aborted (step 406). In the case the authentication was successful, in a further step 408 a calculation of the content hash value (variable ContentHash) is performed. Following, in step 410 a value for the variable SigVal is determined by EXCLUSIVE-OR-combining the disc key with the value of the variable ContentHash. Hereafter, in step 412, the node key is calculated for example according to the method as disclosed in FIG. 3 (the step 412). Followed hereafter, a value for a variable SignedVal is determined by an AES-decryption operation using the determined node key and the value of the field of the array-variable Signature, having an ordering index being equal to the value of the variable CurrentPos (step 414). Thus, it is clear that the values of the array-variable Signature should to be stored on the DVD. In a further step 416 the value of the variable SignedVal is compared to the value of the variable SigVal. If both values are equal, a signal is returned in step 418 indicating that the signature is considered to be valid. Otherwise, in a step 420 a signal is returned indicating that the signature is considered to be invalid.

Thus, FIG. 4 illustrates the an example of the entire process of signature verification, utilizing the process described in FIG. 3 in order to recover the node key from a root key and a binary tree.

Summarizing, the present patent application relates to a method for signing a data package using preferably a symmetric encryption with the possibility to revoke signatures.

Furthermore, the present invention preferably relates to signing of digital data to prove that the data has been generally produced by a party that is known to the receiver and hasn't been altered since it has been signed.

In addition, the present invention preferably relates to signing of digital data using symmetric encryption where the producer of digital data holds the secret allowing him to sign the produced data and where the receiver of digital data holds the secret to prove that the digital data has been created by the holder of a specific identity expressed through the knowledge of a secret.

Furthermore, the present invention also preferably relates to the validation of the digital signature if the signer is known to have been compromised or known to be authentic or reliable by altering the means to prove the authenticity of digital data such that it no longer proves data received from such source as authentic.

The present invention preferably also relates to a single set of data used to prove the identity of many different originators each holding their own private secret through which they convey their identity.

Finally, the present invention preferably also relates to proving the legitimacy of digital contents stored on a physical media by creating a unique identifier from the combination of content and physical media it is stored on and ensuring the content is residing on its original physical media.

Depending on certain implementation requirements, the inventive methods can be implemented in hardware or in software. The implementation can be performed using a digital storage medium, in particular a disk or a CD having electronically readable control signals stored thereon, which can cooperate with a programmable computer system such that the inventive methods are performed. Generally, the present invention is therefore a computer program product with a program code stored on a machine-readable carrier, the program code performing the inventive methods when the computer program runs on a computer. In other words, the inventive methods are therefore a computer program having a program code for performing the inventive methods, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for signing a data package using a signing apparatus, the method for signing comprising:

providing a set of node keys and a check value for the data package, the node keys being different from each other and each node key of the set of node keys being identifiable by a node key number and wherein the check value for the data package being derived from the data package or an carrier identification code of an information carrier the data package is stored on;

determining a signature block having a plurality of signature fields, wherein each of the signature fields is identifiable by a signature field number, wherein the signature field having a first signature field number comprises a first encrypted version of the check value, the first encrypted version of the check value being determined using the node key having a first node key number as encryption key and wherein the signature field having a second signature field number comprises a second encrypted version of the check value, the second encrypted version of the check value being calculated using the node key having a second node key number as encryption key, wherein the first signature field number corresponds to the first node key number and the second signature field number corresponds to the second node key number; and providing a binary identification code of the signing apparatus and the signature block in order to sign the data package, wherein the binary identification code is assigned to the signing apparatus.

2. The method according to claim 1, wherein the binary identification code has a predefined number of bits, wherein the set of node keys has a predefined number of node keys and wherein the step of determining comprises determining a signature block having a predefined number of signature fields, wherein the predefined number of bits corresponds to the predefined number of node keys and to the predefined number of signature fields.

3. The method according to claim 1, wherein the first node key is uniquely assigned to the signing apparatus and the second node key is assigned to the signing apparatus and a further signing apparatus, wherein the binary identification code has a most significant bit and a second-most significant bit, wherein the determining comprises arranging the first encrypted version in a signature field having a position in the signature block corresponding to a position of the most significant bit in the binary identification code and wherein the determining comprises arranging the second encrypted version in a signature field having a position in the signature block corresponding to a position of the second-most significant bit in the binary identification code.

4. The method according to claim 1, wherein the determining comprises performing a symmetric encryption operation in order to obtain the first and second encrypted version of the check value.

5. The method according to claim 4 wherein the performing the symmetric encryption operation comprises performing an encryption operation according to the advanced encryption standard.

6. The method according to claim 1, wherein the step providing the set of node keys and a check value comprises calculating a Hash function on the data package in order to obtain a Hash value and wherein the providing the set of node keys and a check value furthermore comprises performing a logical EXCLUSIVE-OR-combination of the Hash value and the carrier identification code, wherein the carrier identification code is uniquely assigned to the information carrier.

7. The method according to claim 6, wherein the calculating the Hash function comprises recursively encrypting a segment of the data package using the Hash value of a preceding iteration step of the recursion as an encryption key.

8. The method according to claim 1, further comprising:
storing the binary identification code of the signing apparatus and the signature block on the information carrier the data package is stored on.

9. A signing apparatus for signing a data package, the signing apparatus comprising:
a provider being configured for providing a set of node keys and a check value for the data package, the node keys being different from each other and each node key of the set of node keys being identifiable by a node key number and wherein the check value for the data package being derived from the data package or an carrier identification code of an information carrier the data package is stored on;

a determiner being configured for determining a signature block having a plurality of signature fields, wherein each of the signature fields is identifiable by a signature field number, wherein the signature field having a first signature field number comprises a first encrypted version of the check value, the first encrypted version of the check value being determined using the node key having a first node key number as encryption key and wherein the signature field having a second signature field number comprises a second encrypted version of the check value, the second encrypted version of the check value being calculated using the node key having a second node key number as encryption key, wherein the first signature field number corresponds to the first node key number and the second signature field number corresponds to the second node key number; and a provider being configured for providing a binary identification code of the signing apparatus and the signature block in order to sign the data package, wherein the binary identification code is assigned to the signing apparatus.

10. A method for validating a signature of an data package using a validation apparatus, wherein the data package, a signature block and a binary identification code of a signing apparatus is stored on an information carrier, the signature block having a plurality of signature fields, wherein each of the signature fields is identifiable by a signature field number and wherein each of the signature fields having stored therein a signature code and wherein a root key and a binary tree is stored on a memory in the validation apparatus, the method:

reading the data package, the signature block and the binary identification code from the information carrier;

providing a check value for the data package wherein the check value for the data package being derived from the data package or an carrier identification code of an information carrier the data package is stored on;

calculating a node key and a position number on the basis of the root key, the binary tree and the binary identification code using the binary identification code as a scheme for passing through the binary tree;

decrypting the signature code being stored in the signature field having a signature field number corresponding to the position number, wherein the node key being used as decryption key in order to obtain a reference value, or, encrypting the check value using the node key as an encryption key in order to obtain a further reference value; and accepting the signature as valid, if the reference value is in a predefined relation with the check value or if the further reference value is in a predefined relation to the signature code being stored in the signature field having a signature field number corresponding to the position number.

11. The method according to claim 10, wherein the binary tree comprises leaf nodes having assigned an authorization key, and wherein the calculating comprises encrypting the root key using the authorization key as an encryption key.

12. The method according to claim 11, wherein the encrypting comprises performing a symmetric encryption algorithm for encrypting the root key.

13. The method according to claim 10, wherein a node of the binary tree has a first edge leading to a first child of the node and wherein the node has a second edge leading to a second child of the node, the first edge being a portion of a first path through the binary tree and the second edge being a portion of a second path through the binary tree, wherein the calculating comprises determining the first or second path on the basis of a value of a bit in the binary identification code.

14. The method according to claim 13, wherein the binary tree comprises a plurality of levels of nodes, each node of a level of nodes being separated from the root node of the binary tree by an equal number of edges, wherein the binary identification code has a number of positions, each position corresponding to a level of nodes in the binary tree, and wherein the determining the first or second path is further based on considering a value of the bit in a position of the binary identification code to a first level of nodes and on considering a value of a bit in a position of the binary identification code corresponding to a second level of nodes in the binary tree.

15. The method according to claim 10, wherein the calculating comprises recursively using the bits of the binary identification code starting with least significant bit of the binary identification code.

16. The method according to claim 10, wherein a node of the binary tree is a leaf node, wherein the calculating further comprises evaluating the signature as invalid, if using the binary identification code as a scheme for passing through the binary tree leads to a leaf node and a number of bits of the binary identification code is larger than a number of edges from the leaf node to the root node in the binary tree.

17. The method according to claim 10, further comprising updating the binary tree in the memory of the validation apparatus.

18. A validation apparatus for validating a signature of an data package, wherein the data package, a signature block and a binary identification code of a signing apparatus is stored on an information carrier, the signature block having a plurality of signature fields, wherein each of the signature fields is identifiable by a signature field number and wherein each of the signature fields having stored therein a signature code and wherein a root key and a binary tree is stored on a memory in the validation apparatus, the validation apparatus comprising:
- a reader being configured for reading the data package, the signature block and the binary identification code from the information carrier;
- a provider being configured for providing a check value for the data package wherein the check value for the data package being derived from the data package or an carrier identification code of an information carrier the data package is stored on;
- a calculator being configured for calculating a node key and a position number on the basis of the root key, the binary tree and the binary identification code using the binary identification code as a scheme for passing through the binary tree;
- a decrypter being configured for decrypting the signature code being stored in the signature field having a signature field number corresponding to the position number, wherein the node key being used as decryption key in order to obtain a reference value, or, encrypting the check value using the node key as an encryption key in order to obtain a further reference value; and
- an acceptor being configured for accepting the signature as valid, if the reference value is in a predefined relation with the check value or if the further reference value is in a predefined relation to the signature code being stored in the signature field having a signature field number corresponding to the position number.

19. A digital storage medium having stored thereon a program having a program code for performing a method for signing a data package using a signing apparatus, the method for signing comprising:

providing a set of node keys and a check value for the data package, the node keys being different from each other and each node key of the set of node keys being identifiable by a node key number and wherein the check value for the data package being derived from the data package or an carrier identification code of an information carrier the data package is stored on;

determining a signature block having a plurality of signature fields, wherein each of the signature fields is identifiable by a signature field number, wherein the signature field having a first signature field number comprises a first encrypted version of the check value, the first encrypted version of the check value being determined using the node key having a first node key number as encryption key and wherein the signature field having a second signature field number comprises a second encrypted version of the check value, the second encrypted version of the check value being calculated using the node key having a second node key number as encryption key, wherein the first signature field number corresponds to the first node key number and the second signature field number corresponds to the second node key number; and providing a binary identification code of the signing apparatus and the signature block in order to sign the data package, wherein the binary identification code is assigned to the signing apparatus, if the computer program runs on a computer.

20. A digital storage medium having stored thereon a program having a program code for performing a method for validating a signature of a data package using a validation apparatus, wherein the data package, a signature block and a binary identification code of a signing apparatus is stored on an information carrier, the signature block having a plurality of signature fields, wherein each of the signature fields is identifiable by a signature field number and wherein each of the signature fields having stored therein a signature code and wherein a root key and a binary tree is stored on a memory in the validation apparatus, the method comprising:

reading the data package, the signature block and the binary identification code from the information carrier;

providing a check value for the data package wherein the check value for the data package being derived from the data package or an carrier identification code of an information carrier the data package is stored on;

calculating a node key and a position number on the basis of the root key, the binary tree and the binary identification code using the binary identification code as a scheme for passing through the binary tree;

decrypting the signature code being stored in the signature field having a signature field number corresponding to the position number, wherein the node key being used as decryption key in order to obtain a reference value, or, encrypting the check value using the node key as an encryption key in order to obtain a further reference value; and accepting the signature as valid, if the reference value is in a predefined relation with the check value or if the further reference value is in a predefined relation to the signature code being stored in the signature field having a signature field number corresponding to the position number, if the computer program runs on a computer.

* * * * *